United States Patent [19]
Burdick et al.

[11] Patent Number: 6,041,352
[45] Date of Patent: Mar. 21, 2000

[54] RESPONSE TIME MEASURING SYSTEM AND METHOD FOR DETERMINING AND ISOLATING TIME DELAYS WITHIN A NETWORK

[75] Inventors: Matt Burdick, San Jose; Gigi Chu, Santa Clara, both of Calif.

[73] Assignee: Hewlett-Packard Company, Palo Alto, Calif.

[21] Appl. No.: 09/012,543

[22] Filed: Jan. 23, 1998

[51] Int. Cl.[7] .................................................. G06F 11/14
[52] U.S. Cl. ........................................ 709/224; 370/253
[58] Field of Search ..................... 395/200.53, 200.54, 395/200.63, 200.56; 370/516, 253; 709/223, 224, 226, 233

[56] References Cited

U.S. PATENT DOCUMENTS

| | | | |
|---|---|---|---|
| 5,095,444 | 3/1992 | Motles | 709/224 |
| 5,459,837 | 10/1995 | Caccavale | 709/226 |
| 5,521,907 | 5/1996 | Ennis, Jr. et al. | 370/253 |
| 5,561,791 | 10/1996 | Mendelson et al. | 709/233 |
| 5,644,717 | 7/1997 | Clark | 709/224 |
| 5,664,106 | 9/1997 | Caccavale | 709/224 |
| 5,764,912 | 6/1998 | Rosborough | 709/224 |
| 5,793,976 | 8/1998 | Chen et al. | 709/224 |
| 5,805,602 | 9/1998 | Cloutier et al. | 370/516 |

FOREIGN PATENT DOCUMENTS 0 415 843 A2   6/1991   European Pat. Off. .

*Primary Examiner*—Zarni Maung
*Assistant Examiner*—Patrice Winder

[57] ABSTRACT

Promiscuous probes are inserted at various locations in a network to determine response times at the various locations. Each probe identifies each signal detected as a request signal or a response signal. Furthermore, each probe determines and maintains a time stamp value of each detected signal. By comparing the time stamp values of a response signal with its corresponding request signal, the response time for the request/response transaction can be determined. A system manager monitors the response times at the various locations in the network in order to determine where a slowdown in data transfer is occurring. Accordingly, the system manager can isolate problems within the network which cause a decrease in data transfer efficiency.

33 Claims, 4 Drawing Sheets

RESPONSE TIME MEASURING SYSTEM AND METHOD FOR DETERMINING AND ISOLATING TIME DELAYS WITHIN A NETWORK

FIELD OF THE INVENTION

The present invention generally relates to data communication and, in particular, to a response time measuring system and method for determining and isolating time delays associated with the transfer of data through a network.

BACKGROUND OF THE INVENTION

Networking systems transfer data at high rates of speeds in order to reduce the amount of time required to complete a transaction. In order to maintain network efficiency, it is important to discover the existence of a data transfer problem within the network responsible for reducing the data transfer rate. By monitoring the response time required for the network to complete a transaction, it can be determined when a data transfer problem exists within the network. In this regard, when the response time for a particular transaction increases to an unusually high level, it can be assumed that a data transfer problem exists. Action can then be taken to locate and correct the problem in order to increase the efficiency of the network.

Conventional network monitoring systems utilize application response measurement (ARM) technology. In ARM technology, stop and start calls are inserted into an application whereby the start and stop calls record the time stamp of the time at which they were called. By subtracting the time stamp of the stop call from that of the start call, the response time for the application can be determined.

However, ARM technology only measures the response time of the application as experienced by the device originating the application. The data transfer problem may occur at any point within the network, and ARM technology fails to isolate the location of the problem. Therefore, additional steps must be taken in order to determine the cause and location of the data transfer problem resulting in additional costs in time and labor.

Thus, a heretofore unaddressed need exists in the industry for providing a system and method of determining response times associated with a network such that problems causing slowdowns in data transfer may be isolated.

SUMMARY OF THE INVENTION

The present invention overcomes the inadequacies and deficiencies of the prior art as discussed herein. The present invention provides a system and method of discovering and isolating data transfer problems within a network.

The present invention utilizes a probe configured to detect and identify request signals and response signals transmitted within a network. The probe is preferably designed to determine whether each response signal corresponds with a request signal. By measuring a time delay between the detection of a request signal and the detection of a corresponding response signal, the response time for a particular transaction may be determined.

In accordance with another feature of the present invention, multiple probes may be placed at different locations on a path connecting two devices, such as a client and a server, for example. By monitoring each probe, exact locations of a slowdown in data transfer can be determined.

In accordance with another feature of the present invention, the probe utilizes data transmission protocol data in order to identify request and response signals. Data transmission protocol data may include, for example, the source port, the destination port and the amount of data associated with the request and response signals.

The present invention has many advantages, a few of which are delineated hereafter, as mere examples.

An advantage of the present invention is that response times can be easily measured for any location within a network. Therefore, performance of the network can be easily determined.

Another advantage of the present invention is that problems causing a slowdown in data transfer may be quickly and inexpensively isolated thereby increasing the overall performance of the network.

Another advantage of the present invention is that jitter and/or throughput for an application may be determined.

Another advantage of the present invention is that performance of a network can be measured passively without affecting the transfer of data through the network.

Another advantage of the present invention is that an application's performance across a network can be measured without access to or modification of the application's source code.

Other features and advantages of the present invention will become apparent to one skilled in the art upon examination of the following drawings in the detailed description. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
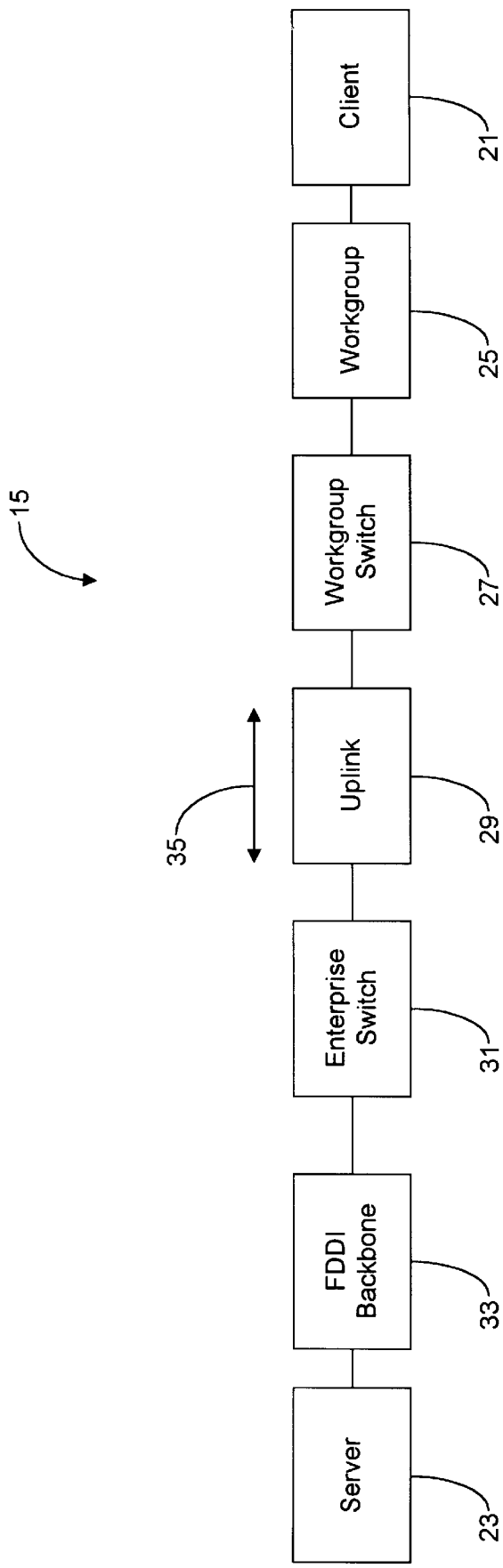
FIG. 1 is a block diagram illustrating a transmission path of a network in accordance with the prior art.

A typical networking system 15 having a client computer 21 (hereinafter referred to as "client") connected to a server computer 23 (hereinafter referred to as "server") is depicted in FIG. 1. FIG. 1 shows an implementation where, for example, the client 21 is connected to the server 23 through workgroup 25, workgroup switch 27, uplink 29, enterprise switch 31 and fiber distributed data interface (FDDI) backbone 33. As known in the art, server 23 contains databases of information from which a client 21 can request data information. In this regard, client 21 generates a request signal typically in form of a data packet in conformance with standard hypertext transfer protocol (HTTP). Workgroup switch 27 switches the request out of workgroup 25 and onto uplink 29 which is the transmission link between the premises of the client 21 and the premises of the server 23. Uplink 29 can be any suitable transmission link such as, for example, a satellite link. Enterprise switch 31 switches the request from uplink 29 to FDDI backbone 33 which routes the request to server 23. The path connecting client 21 to server 23 (including workgroup 25, workgroup switch 27, uplink 29, enterprise switch 31 and FDDI backbone 33) will be referred to hereafter as "the transmission path 35."

Server 23 receives and processes the request signal and generates a response signal which is transmitted to client 21 back through the transmission path 35 described hereinabove. This response signal may include more than one data packet. For example, assume that a user wishes to access an internet web page from a web server 23. The user, via client 21, first sends a request through the transmission path 35 as represented by arrow 41 in FIG. 2, wherein each arrow represents a data packet. The server 23 (FIG. 1) receives the request and responds by sending an hypertext markup language (HTML) file (represented by arrows 43 and 45 in FIG. 2) of the requested web page through the transmission path 35 (FIG. 1) to client 21. Client 21 receives and processes the HTML file and usually determines that an image file is needed.

Figure 2:
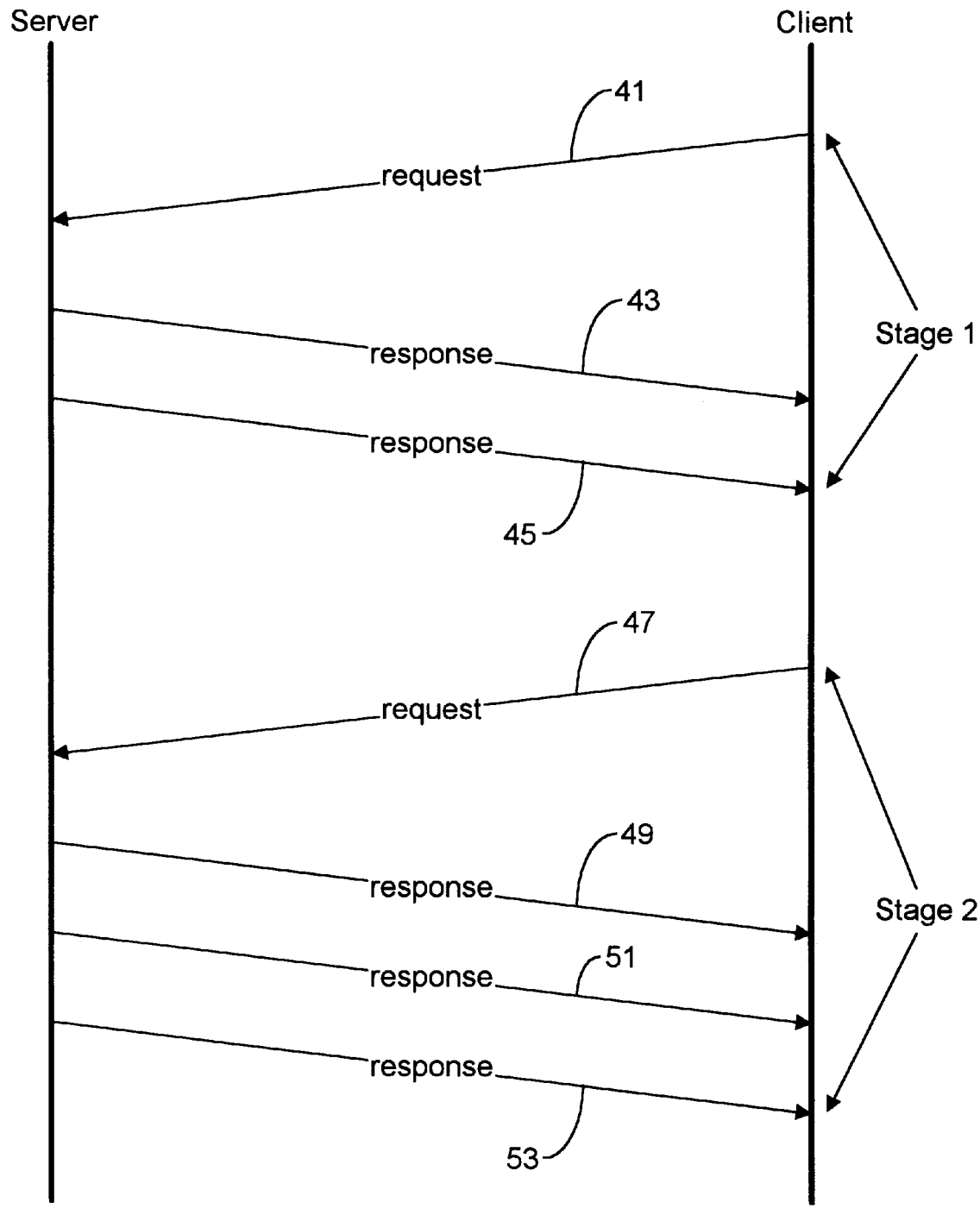
FIG. 2 is a diagram illustrating a sequence of transactions used to access a web page in accordance with principles of the prior art.

Accordingly, the client 21 sends another request, represented by arrow 47 in FIG. 2, through the transmission path 35 (FIG. 1) to server 23 requesting the appropriate image file. The server 23 responds by transmitting the appropriate image file (represented by arrows 49, 51 and 53 in FIG. 2) through the transmission path 35 to client 21 which now has enough data to display the web page to the user. Accordingly, the entire application of displaying a web page encompasses two stages. The first stage (stage 1) is the procurement of the appropriate HTML file, and the second stage (stage 2) is the procurement of the appropriate image file.

In many situations it is desirable to know the response time of a particular transaction. For example, in the application of accessing a web page, it may be desirable to know the response time of stage 1 of FIG. 2. For the purposes of this discussion, a "response time" refers to the amount of time between the transmission of a request signal and the reception of the last response signal associated with the request signal. For example, the response time of stage 1 of FIG. 2 is the amount of time between the transmission of the request signal represented by arrow 41 and the reception of the response signal represented by arrow 45. Unusually long response times may indicate that a data transfer problem exists in the transmission path 35, server 23 or client 21. Therefore, upon detection of unusually long response times, corrective action may be taken to try to identify and correct the problem so that increased performance may be realized.

Response times are conventionally measured at the device originating the transaction (i.e., client 21 in the web page accessing application) with application response measurement (ARM) technology. ARM technology involves instrumenting each client application with application programming interface (API) calls. These API calls are typically start and stop. For each application, a start API call is inserted before the application begins and a stop API call is inserted after the completion of the application. Both the start API call and the stop API call record the time stamp of the time at which they were called so that the difference of the two time stamps is the response time.

However, the ARM technology of the prior art only yields the response time as measured from the device originating the application (i.e., the client 21). Therefore, ARM technology fails to isolate which component of the transmission path 35 is causing the excessive delay. For example, referring again to FIG. 1, an unusually long response time detected by ARM technology fails to indicate whether the client 21, workgroup 25, workgroup switch 27, uplink 29, enterprise switch 31 FDDI backbone 33, server 23 or a combination thereof is causing the excessive delay.

The response time measuring system 80 of the present invention, on the other hand, provides determination and isolation of transmission problem areas within a network 15. The response time measuring system 80 can be implemented in software, hardware, or a combination thereof In the preferred embodiment, as illustrated by way of example in FIG. 3, the response time measuring system 80 of the present invention along with its associated methodology is implemented in software and stored in computer memory 81 of a computer system 83. Note that the response time measuring system 80 can be stored on any computer-readable medium for use by or in connection with a computer-readable system or method. In the context of this document, a computer-readable medium is an electronic, magnetic, optical, or other physical device or means that can contain or store a computer program for use by or in connection with a computer-related system or method. As an example, the response time measuring system 80 may be magnetically stored and transported on a conventional portable computer diskette.

Figure 3:
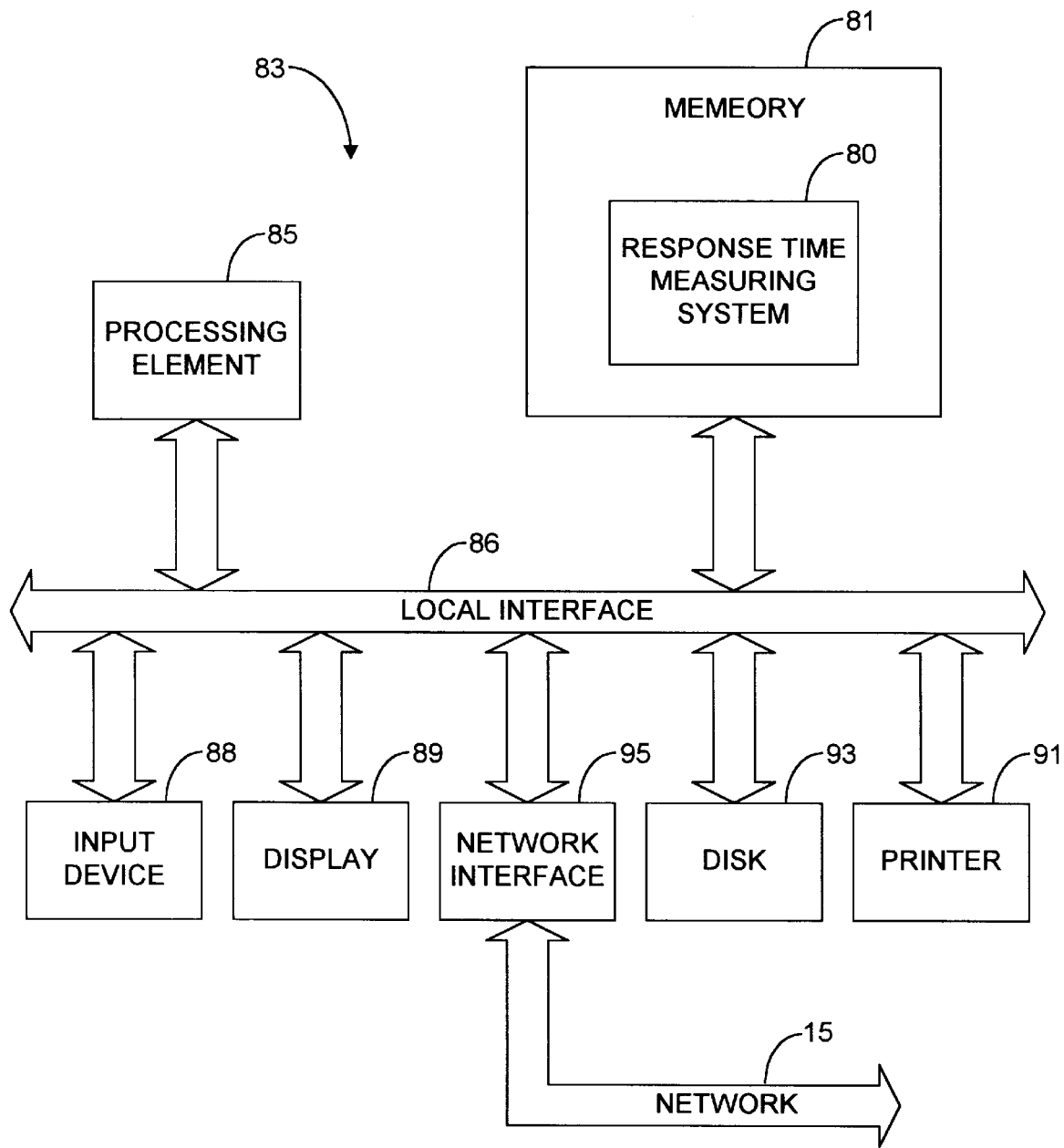
FIG. 3 is a block diagram illustrating a computer system that employs the response time measuring system of the present invention.

The preferred embodiment of the computer system 83 of FIG. 3 comprises one or more conventional processing elements 85, such as digital signal processors (DSPs), that communicate to the other elements within the system 83 via a local interface 86, which can include one or more buses. Furthermore, an input device 88, for example, a keyboard or a mouse, can be used to input data from a user of the system 83, and screen display 89 or a printer 91 can be used to output data to the user. A disk storage mechanism 93 can be connected to the local interface 86 to transfer data to and from a nonvolatile disk (e.g., magnetic, optical, etc.). The system 83 is preferably connected to a network interface 95 that allows the system 83 to exchange data with the network 15.

Figure 4:
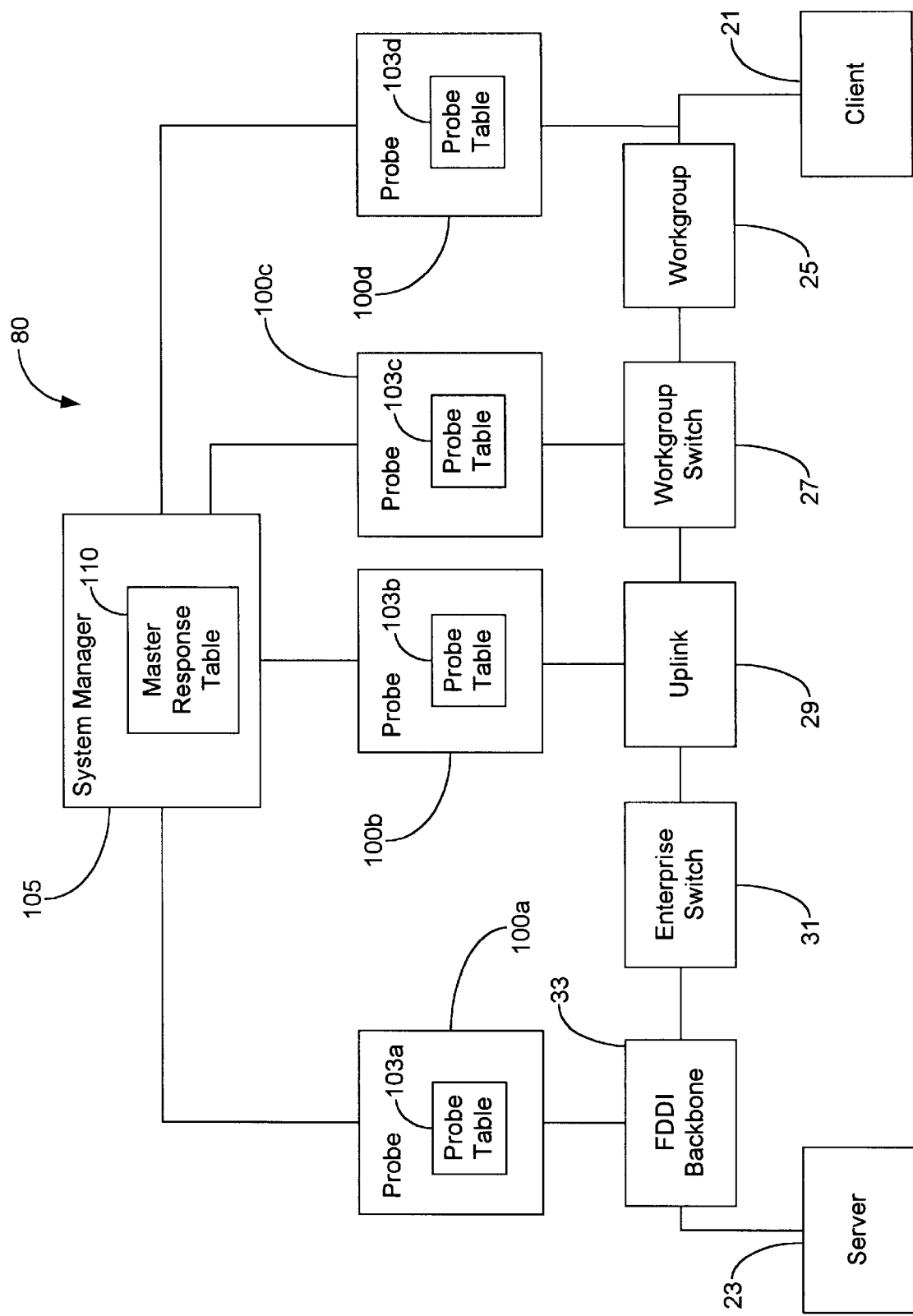
FIG. 4 is a block diagram illustrating the response time measuring system of the present invention.

FIG. 4 depicts the preferred implementation of the response time measuring system 80 of the present invention. Referring to FIG. 4, at least one promiscuous probe 100 is connected to the network 15 at various points along the transmission path 35. Each probe 100 is designed to uniquely identify the signals detected at the probe's 100 point of connection. For example, probes 100a, 100b and 100c are configured to uniquely identify the signals detected at FDDI backbone 33, enterprise switch 31 and workgroup switch 27, respectively. Furthermore, probe 100d is configured to uniquely identify the signals detected between client 21 and workgroup 25.

Each probe 100 is preferably designed to utilize transmission control protocol (TCP) to identify the request and response signals. In this regard, each probe 100 is designed to use the TCP sequence and acknowledgment numbers, the TCP port numbers, and the size of the TCP data to identify a particular signal as a request signal or a response signal. The following depicts an algorithm that may be used with TCP to determine whether a signal is a request or a response.

```
if (packet protocol is TCP) {
    // Determine if the packet is a request or response
    // based on the src/dest ports, TCP data length, and
    // TCP flags (ACK, SYN, RST, PSH, and FIN).
    if (RST || (FIN && (TCP data length == 0) ) ) {
        // a TCP reset sequence or finish sequence, so
        // no response expected
        ReqRespType = Neither;
    } else if (port is server) {
        // must be a response from the server
        ReqRespType = Response;
    } else if ( (ACK alone) && (TCP data length == 0) ) ) {
        // last packet of connection setup
        ReqRespType = Neither;
    } else if (dest port is not well-known) {
        // neither src nor dest is well-known
        ReqRespType = Neither;
    } else
        // The remaining cases can be classified as
        // requests. The following have been observed
        // so far:
        //    SYN with no data - connect request
        //    dest port is well-known and has TCP data
        //            data request
        ReqRespType = Request;
    }
}
```

Once a probe 100 identifies a particular signal as a request or a response signal, the probe is designed to assign the signal a response identification (RID). Each signal associated with a particular transaction is assigned the same RID by each probe 100. The following depicts an algorithm that may be used with TCP to determine a signal's RID.

```
if ( packet protocol is TCP ) {
    // Determine the Response ID from the ReqRespType,
    // TCP data length, sequence number, and
    acknowledgment
        // number.
        If ( ReqRespType == Request ) {
            if ( TCP data length == 0 ) {
                // This is a connection request; the receiver
                // is expected to respond with an ACK
    number
                // equaling the requester's sequence
    number
                // plus one.
                RID = SeqNum + 1;
            } else {
                // This is a data request from a client.
    The
                // receiver is expected to respond with the
                // acknowledge number equaling the
                // requester's sequence number plus the
    TCP
                // data length (indicating the sequence
                // number it expects to receive next).
                RID = SeqNum + TCP data length;
            }
        } else if ( ReqRespType == Response ) {
            // RID for response is simply the
    acknowledgment
            // number.
            RID = AckNum;
        }
}
```

After properly identifying the signal, the probe 100 is preferably configured to determine a time stamp value indicating the respective time of detection by the probe 100. Probe 100 is then designed to store the information regarding each signal's identification, including the signal's RID and time stamp value, into probe table 103 within memory 81 (FIG. 3).

A system manager 105 is configured to manage the data collected by the probes 100 in order to determine response times and to isolate problematic components within the transmission path 35. The system manager 105 is preferably configured to compile the information collected by each probe 100 and store the information into a master response table 110. The system manager 105 is then designed to compare the time stamp values of the requests and responses of particular transactions in order to determine whether the response time at each probe is within an acceptable range. If a data transfer problem exists which causes a delay in response time, the system manager 105 is designed to discover the problem and to determine where the problem is occurring based on which probe(s) 100 is/are yielding an excessive response time.

OPERATION

The preferred use and operation of the present invention and associated methodology are described hereafter.

Assume for illustrative purposes that a user wishes to access a web page as described hereinbefore and depicted in FIG. 2. In the scenario depicted in FIG. 2, client 21 (FIG. 4) initially transmits a request signal (represented by arrow 41 in FIG. 2) and then receives two response signals (represented by arrows 43 and 45) from server 23 (FIG. 4) wherein the two response signals together define the appropriate HTML file for the web page requested. Each probe 100 (FIG. 4) detects and identifies each signal as the signal passes through each probe's 100 point of connection to transmission path 35.

For illustrative purposes, the operation of probe 100*a* will be described in further detail. The operation of the other probes 100*b*, 100*c* and 100*d* adhere to the same principles but will not be discussed in detail. As each signal associated with stage 1 (FIG. 2) passes through FDDI backbone 33 (FIG. 4), probe 100*a* identifies the signal and saves pertinent TCP information that adequately identifies the signal. The saved TCP information may include, for example, the source port, destination port and number of bytes within the signal. Furthermore, the signal is assigned a particular RID, and the time stamp indicating the time that the signal passed through FDDI backbone 33 is also saved. All of this information is preferably maintained in a tabular format although other types of formats are possible. Table 1 illustrates an example of a probe 103*a* that might depict information for the web accessing application of FIG. 2.

TABLE 1

| Time Stamp | Source IP | Destination IP | Source Port | Destination Port | Bytes | Type | RID |
|---|---|---|---|---|---|---|---|
| 1 | C | S | 2778 | http | 128 | Request | 1 |
| 3 | S | C | http | 2778 | 64 | Response | 1 |
| 5 | S | C | http | 2778 | 89 | Response | 1 |
| 7 | C | S | 2779 | http | 128 | Request | 6 |
| 9 | S | C | http | 2778 | 64 | Response | 6 |
| 12 | S | C | http | 2778 | 89 | Response | 6 |
| 14 | S | C | http | 2778 | 128 | Response | 6 |

In Table 1, client 21 and server 23 are assumed to have TCP port numbers of 2778 and 2779, respectively. Rows 1–3 of Table 1 (having an RID of 1) correspond to the detection of the three signals associated with stage 1 (FIG. 2), and rows 4–7 (having an RID of 6) correspond to the detection of the four signals associated with stage 2 (FIG. 2). It should be noted that the rows corresponding to the same transaction or stage are assigned the same RID both within probe 100a and within probes 100b, 100c and 100d as well. Furthermore, each RID is unique for a particular transaction such that no other transaction has the same RID within a predetermined time interval.

System manager 105 compiles the information from each probe table 103a, 103b, 103c, and 103d into master response table 110. Table 2 illustrates an example of a master response table 110 that might depict information for the web accessing application of FIG. 2 and Table 1.

TABLE 2

| Client | Server | RID | Probe | Ports | Response Time | Request Bytes | Response Bytes |
|---|---|---|---|---|---|---|---|
| C | S | 1 | 100a | 2778/http | 4 | 128 | 153 |
| C | S | 1 | 100b | 2778/http | 8 | 128 | 153 |
| C | S | 1 | 100c | 2778/http | 16 | 128 | 153 |
| C | S | 1 | 100d | 2778/http | 19 | 128 | 153 |
| C | S | 6 | 100a | 2779/http | 7 | 128 | 285 |
| C | S | 6 | 100b | 2779/http | 12 | 128 | 285 |
| C | S | 6 | 100c | 2779/http | 24 | 128 | 285 |
| C | S | 6 | 100d | 2779/http | 30 | 128 | 285 |

By subtracting the time stamp value of the last response in a transaction (i.e., the time stamp of the response having the latest time stamp with the same RID) from the time stamp value of the request having the same RID, the response time at each probe for each transaction can be calculated and included within the master response table 110 of system manager 105. For example, the time stamp value of the request signal and last response signal of stage 1 (FIG. 2) in Table 1 is 1 and 5, respectively. Therefore, the difference of these numbers yields the response time of stage 1 as measured at probe 100a. This difference (4) is depicted in the first row of Table 2 as the response time for probe 100a and RID 1 where RID 1 corresponds to stage 1. Furthermore, the time stamp of the request signal and last response signal of stage 2 (FIG. 2) in Table 1 is 7 and 14, respectively. The difference of these two numbers is depicted as the response time in Table 2 for probe 100a and RID 6 where RID 6 corresponds to stage 2. The other response times of the other probes' 100b, 100c and 100d are obtained and listed in the same manner although not discussed in detail herein.

The master response table 110 within system manager 105 maintains a listing of response times at various locations along the transmission path 35 so that transmission problems along the transmission path 35 may be detected and isolated. If the response time for probe 100a, for example, is unusually high, then it is known that a transmission problem exists between FDDI backbone 33 and server 23. On the other hand, if the response time of probe 100b is unusually high and the response time of probe 100a is normal, then it is known that a transmission problem exists between uplink 29 and FDDI backbone 33. By isolating the portion of network 15 containing the transmission problem, the amount of time and effort required to correct the problem can be significantly reduced thereby increasing the performance of the network 15.

It should be noted that for the purposes of obtaining the values for Table 2, it was assumed that the response time is defined by the time between a request and the last response detected for the request. However, as can be appreciated by one ordinarily skilled in the art upon reading of this disclosure, delay times for each response, not just the latest response, can be calculated and monitored if desired.

Furthermore, by dividing the number of bytes transmitted during a transaction by the corresponding response time (i.e., dividing the sum of the "Request Bytes" column and the "Response Bytes" column by the "Response Time" column of a particular row within Table 2), the throughput for the client/server connections can be calculated. In addition, in voice/video applications, jitter can be determined by measuring the changes in response times.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A response time measuring system for determining time delays within a network, comprising:

a first probe coupled to a first point of a network, said first probe responsive to a detection of a first signal by said first probe and to a detection of a second signal by said first probe for identifying said first signal as a request signal and for identifying said second signal as a response signal associated with said first signal, said first probe configured to determine timing information associated with said detections of said first and second signals by said first probe;

a second probe coupled to a second point of said network, said second probe responsive to a detection of said first signal by said second probe and to a detection of said second signal by said second probe for identifying said first signal as a request signal and for identifying said second signal as a response signal associated with said first signal, said second probe configured to determine timing information associated with said detections of said first and second signals by said second probe; and a system manager in communication with said first and second probes, said system manager configured to compare said timing information of said first and second probes in response to a determination that said timing information of said first probe and said timing information of said second probe are each associated with said first and second signals, said system manager further configured to automatically determine whether a data transfer problem exists between said first and second points of said network by comparing said timing information of said first and second probes.

2. The system of claim 1, further comprising:

a first device configured to generate said first signal; and a second device configured to receive said first signal and to generate said second signal in response to said first signal, said second device coupled to said first device via said network.

3. The system of claim 1, wherein said first point and said second points are within a path of said network connecting a client to a server.

4. The system of claim 1, wherein said system manager is further configured to determine a jitter value based on said timing information.

5. The system of claim 1, wherein said system manager is further configured to determine a throughput value based on said timing information.

6. The system of claim 1, wherein said first probe and said second probe are further configured to assign an identification to said request signal and said response signal, wherein said system manager utilizes said identification to determine whether said timing information of said first and second probes are each associated with said first and second signals.

7. The system of claim 1, wherein said first and second probes identify said request signal and said response signal by comparing transmission control protocol data associated with said request and response signals.

8. The system of claim 7, wherein said transmission control protocol data includes port numbers corresponding to destination ports and source ports for said request and response signals.

9. The system of claim 7, wherein said transmission control protocol data includes a first number corresponding to an amount of data associated with said request signal and includes a second number corresponding to an amount of data associated with said response signal.

10. The system of claim 1, wherein said first probe is further configured to determine a first time stamp value associated with said detection of said request signal by said first probe and to determine a second time stamp value associated with said detection of said response signal by said first probe.

11. The system of claim 8, wherein said system manager determines a time delay by subtracting said second time stamp value from said first time stamp value.

12. A system for determining time delays within a network, comprising:

a plurality of probes coupled to said network at different locations within said network, each probe of said plurality of probes configured to identify a request signal and a response signal, to maintain timing data associated with said request signal and response signal, and to indicate whether said response signal corresponds with said request signal; and a system manager in communication with each of said probes, said system manager configured to determine time delays between said request signal and said response signal at each of said locations, said system manager further configured to analyze said time delays to isolate a data transfer problem within said network.

13. The system of claim 12, wherein said system manager is further configured to calculate jitter based on said time delays.

14. The system of claim 12, wherein said system manager is further configured to calculate throughput based on said time delays.

15. The system of claim 12, wherein said each of said probes compares transmission control protocol data in order to identify said request and response signals.

16. A system for determining time delays within a network, comprising:

means for detecting a first signal and a second signal at a first point within said network;

means for detecting said first signal and said second signal at a second point within said network;

means for identifying said first signal as a request signal and said second signal as a response signal associated with said request signal;

means for determining a first time delay and a second time delay, said first time delay indicating an amount of time between detection of said first signal at said first point and said second signal at said first point, said second time delay indicating an amount of time between detection of said first signal at said second point and said second signal at said second point; and means for comparing said first time delay with said second time delay and for determining whether a data transfer problem exists between said first point and said second point based on a comparison of said first time delay with said second time delay.

17. A method, comprising the steps of:

(a) detecting a first signal at a first point within a network;

(b) detecting said first signal at a second point within said network;

(c) detecting a second signal at said first point within said network;

(d) detecting said second signal at said second point within said network;

(e) identifying said first signal as a request signal and said second signal as a response signal associated with said request signal; and (f) determining a first time delay, said first time delay indicating an amount of time between steps (a) and (c);

(g) determining a second time delay, said second time delay indicating an amount of time between steps (b) and (d);

(h) comparing said first time delay with said second time delay; and (i) automatically determining whether a data transfer problem exists between said first and second points based on said comparing step.

18. The method of claim 17, further including the step of determining a jitter value based on one of said time delays.

19. The method of claim 17, further comprising the step of determining a throughput value based on one of said time delays.

20. The method of claim 17, wherein said first and second points are within a path of said network connecting a client to a server.

21. The method of claim 17, further including the step of correlating a first time stamp value with said request signal and correlating a second time stamp value with said response signal.

22. The method of claim 21, wherein step (f) further includes the step of subtracting said second time stamp value from said first time stamp value.

23. The method of claim 17, further comprising the step of correlating said response signal with said request signal.

24. The method of claim 23, wherein said correlating step includes the step of assigning a matching identification value to said request signal and said response signal.

25. The method of claim 17, wherein said identifying step includes the step of comparing transmission control protocol data associated with said request and response signals.

26. The method of claim 25, wherein said transmission protocol data includes port numbers corresponding to destination ports and source ports for said response and request signals.

27. The method of claim 25, wherein said transmission control protocol data includes a first number corresponding to an amount of data associated with said request signal and includes a second number corresponding to an amount of data associated with said response signal.

28. A method for determining response times at various locations in a path connecting a first computer to a second computer, comprising the steps of:

identifying signals passing through a first point within said path as a response signal or a request signal;

identifying signals passing through a second point within said path as a response signal or a request signal;

determining which of said signals are associated with a particular transaction;

assigning a particular identification value to each signal identified in said identifying steps that is associated with said transaction;

comparing timing information of request signals and response signals having matching identifications;

determining a first time delay based on said comparing step, said first time delay indicating an amount of delay associated with said transaction as measured from said first point;

determining a second time delay based on said comparing step, said second time delay indicating an amount of delay associated with said transaction as measured from said second point;

analyzing said first and second time delays; and automatically isolating a data transfer problem within said network via said analyzing step.

29. The method of claim 28, wherein said first computer is a server and said second computer is a client within a network.

30. The method of claim 28, wherein said identifying steps further include the step of comparing transmission control protocol data associated with said request and response signals.

31. The method of claim 28, wherein said timing information includes time stamp values associated with said request and response signals.

32. The method of claim 28, further including the step of determining jitter values based on said time delays.

33. The method of claim 28, further including the step of determining throughput values based on said time delays.

* * * * *